(12) United States Patent
Wang et al.

(10) Patent No.: US 11,155,475 B2
(45) Date of Patent: Oct. 26, 2021

(54) SKID MOUNTED DEVICE FOR UPPER-SPREADING INTERNAL DIFFUSION VERTICAL PLUG FLOW PHOTOCATALYTIC WASTEWATER TREATMENT

(71) Applicant: YUNNAN UNIVERSITY, Kunming (CN)

(72) Inventors: Jiaqiang Wang, Kunming (CN); Wei Wang, Kunming (CN); Yizhou Li, Kunming (CN); Liang Jiang, Kunming (CN)

(73) Assignee: YUNNAN UNIVERSITY, Kunming (CN)

( * ) Notice: Subject to any disclaimer, the term of this patent is extended or adjusted under 35 U.S.C. 154(b) by 84 days.

(21) Appl. No.: 16/607,111

(22) PCT Filed: May 5, 2018

(86) PCT No.: PCT/CN2018/085751
§ 371 (c)(1),
(2) Date: Oct. 22, 2019

(87) PCT Pub. No.: WO2018/228080
PCT Pub. Date: Dec. 20, 2018

(65) Prior Publication Data
US 2020/0131055 A1    Apr. 30, 2020

(30) Foreign Application Priority Data
Jun. 16, 2017   (CN) .......................... 201710459122.0

(51) Int. Cl.
*C02F 1/32*   (2006.01)
*C02F 1/52*   (2006.01)
(Continued)

(52) U.S. Cl.
CPC ............ *C02F 1/325* (2013.01); *C02F 1/5281* (2013.01); *C02F 1/725* (2013.01); *C02F 9/00* (2013.01);
(Continued)

(58) Field of Classification Search
CPC ...................................... C02F 1/325
See application file for complete search history.

(56) References Cited

U.S. PATENT DOCUMENTS 5,178,755 A * 1/1993 LaCrosse .................. C02F 1/32
                                                     210/195.1
5,725,757 A * 3/1998 Binot ........................ A61L 2/10
                                                     210/105
(Continued)

FOREIGN PATENT DOCUMENTS

CN        1412129 A       4/2003
CN        1502562 A   *   6/2004   .............. B01J 21/06
(Continued)

OTHER PUBLICATIONS

Kang, Liming, Application of Skid Mounted Water Treatment Device, Oil and Gas Field Surface Engineering(http://www.yqtdmgc.com), Aug. 2013, p. 43, vol. 32, No. 8.

*Primary Examiner* — Peter Keyworth
(74) *Attorney, Agent, or Firm* — Bayramoglu Law Offices LLC

(57) ABSTRACT

A skid mounted device for upper-spreading internal diffusion vertical plug flow photocatalytic wastewater treatment includes internal diffusion vertical plug flow photocatalytic reaction tank groups and a skid base. The internal diffusion vertical plug flow photocatalytic reaction tank groups are arranged on the skid base. The internal diffusion vertical plug flow photocatalytic reaction tank groups are connected to each other in series, in parallel, or in series-parallel. Each internal diffusion vertical plug flow photocatalytic reaction
(Continued)

tank group consists of two or more photocatalytic reaction tanks connected in series, in parallel, or in series-parallel. The wastewater pipes connected to the photocatalytic reaction tanks in each internal diffusion vertical plug flow photocatalytic reaction tank group are mounted above the photocatalytic reaction tanks.

9 Claims, 7 Drawing Sheets

(51) Int. Cl.
  C02F 1/72 (2006.01)
  C02F 9/00 (2006.01)
  C02F 1/00 (2006.01)
  C02F 101/30 (2006.01)

(52) U.S. Cl.
  CPC ........ *C02F 1/001* (2013.01); *C02F 2001/007* (2013.01); *C02F 2101/30* (2013.01); *C02F 2201/008* (2013.01); *C02F 2305/10* (2013.01)

(56) References Cited

U.S. PATENT DOCUMENTS

| | | | | |
|---|---|---|---|---|
| 6,932,947 | B2 * | 8/2005 | Leung | C02F 1/725 |
| | | | | 422/186.3 |
| 2008/0050471 | A1 * | 2/2008 | Omasa | A23L 2/02 |
| | | | | 426/66 |
| 2008/0237141 | A1 * | 10/2008 | Kerfoot | C09K 8/665 |
| | | | | 210/739 |
| 2009/0145855 | A1 * | 6/2009 | Day | C02F 1/325 |
| | | | | 210/748.11 |
| 2012/0031852 | A1 * | 2/2012 | Aglietto | C25B 11/043 |
| | | | | 210/748.09 |
| 2014/0263066 | A1 * | 9/2014 | Senninger | B01D 39/2017 |
| | | | | 210/660 |
| 2016/0009577 | A1 * | 1/2016 | Sinclair | C02F 1/325 |
| | | | | 210/150 |
| 2017/0305762 | A1 * | 10/2017 | Kolch | C02F 1/325 |

FOREIGN PATENT DOCUMENTS

| | | |
|---|---|---|
| CN | 1502562 A | 6/2004 |
| CN | 1799687 A | 7/2006 |
| CN | 200951982 Y | 9/2007 |
| CN | 201686523 U | 12/2010 |
| CN | 202829759 U | 3/2013 |
| CN | 102977246 B | 6/2014 |
| CN | 104230069 A | 12/2014 |
| CN | 104803555 A | 7/2015 |
| CN | 205773725 U | 12/2016 |
| CN | 107021587 A | 8/2017 |
| CN | 107055895 A | 8/2017 |
| CN | 207347311 U | 5/2018 |
| DE | 20122891 U1 | 7/2009 |
| JP | 2003039082 A | 2/2003 |
| KR | 20110116400 A | 10/2011 |
| KR | 20150063801 A | 6/2015 |

\* cited by examiner

SKID MOUNTED DEVICE FOR UPPER-SPREADING INTERNAL DIFFUSION VERTICAL PLUG FLOW PHOTOCATALYTIC WASTEWATER TREATMENT

CROSS REFERENCE TO RELATED APPLICATION

This application is the national phase entry of International Application No. PCT/CN2018/085751, filed on May 5, 2018, which is based upon and claims priority to Chinese Patent Application No. 201710459122.0, filed on Jun. 16, 2017, the entire contents of which are incorporated herein by reference.

TECHNICAL FIELD

The disclosure relates to a wastewater treatment device, specifically to a set of skid mounted photocatalytic wastewater treatment devices capable of efficiently treating wastewater, in particular to a skid mounted device for upper-spreading internal diffusion vertical plug flow photocatalytic wastewater treatment.

BACKGROUND

Skid mounted devices are extensively applied to various industries due to the following characteristics of facilitating installation and transferring: the production and assembly of a skid mounted device are performed in the factory with very little on-site installation work such that the skid mounted device can work after connecting to pipes and external electrical equipment; the functional components are integrated in an entire/whole base, so that the skid mounted device can be easily transferred as a whole; and the skid mounted device is compact in structure and occupies less space than a traditional installation.

The conditional wastewater treatment device has a large construction area and a high-cost project investment and is not suitable for remote areas or small-scale enterprises. In addition, for enterprises lacking enough space/area or finance to construct the wastewater treatment equipment, the wastewater can only be transported to a fixed wastewater treatment station for treatment, which requires massive financial costs, large material consumption and a large amount of manpower. In the photocatalytic reactor, a photocatalytic oxidation reaction occurs under ultraviolet light or sunlight to generate strong oxidative free radicals, which can rapidly and indiscriminately oxidize and decompose various toxic and harmful organic pollutants in water until being thoroughly mineralized into $CO_2$ and $H_2O$. Moreover, the photocatalytic reactor can quickly kill bacteria and viruses in water without secondary pollution and has the advantages of a fast reaction speed and a mild reaction condition, which is regarded as a promising water treatment technology. However, in practice, the large-scale photocatalytic treatment device for the production of wastewater, especially the wastewater with a chemical oxygen demand (COD) greater than 1000 mgL-1, is still rarely reported.

The skid mounted devices are often used in water treatment devices. For example, in the Chinese patent No. CN202829759 U, the skid mounted device is combined with the practical technique applied to the field of drilling wastewater treatment, which takes both the advantages of the skid-mounted device itself and the actual requirements into account, and successfully trial-produced a reusable skid mounted device that is applicable to different drilling sizes. The Chinese patent No. 104230069 A discloses a skid mounted device for potable water treatment, which has a large water treatment capacity, a good water purification effect and good sterilization and disinfection effects. Surface water treated by the device can be directly treated as safe domestic water, potable water, high concentration ozone water or warm water. The Chinese patent No. 104803555 A relates to a mobile skid mounted system for oil and gas field wastewater treatment, which has a good connection between modules and an excellent cooperative wastewater treatment effect and can treat the collected wastewater with the integrated water treatment skid mounted device system to output water that meets the national discharge or reuse standards. The article "Application to the Skid Mounted Water Treat" (from Oil-Gasfield Surface Engineering 2013, August) systematically and integrally teaches a skid mounted water treatment device with an integrated structure, which facilitates transportation and reuse, and solves the problem of wastewater treatment in scattered residential areas or oilfield and cuts down on the investment of station construction while simplifying the process workflow.

The Chinese patent No. CN200520099854.6 titled "low-wall partitioning upper-spreading internal diffusion flax wastewater multistage treatment pool" discloses "an upper-spreading internal diffusion flax wastewater multistage treatment pool". In the pool, a waterfall-like channel is formed by the partitioning of upper-spreading water and the entering wastewater through the channel is subjected to the damping interaction of the water in the next pool, thereby naturally oxygenating the wastewater and meanwhile providing conditions for the microorganism to fully contact the substance to be treated. When flowing to the lower pool, the wastewater is obstructed by the partitions and many large particles settle naturally. A certain reserved settlement space is set aside at the bottom of the pool. When the amount of wastewater is large and the impact is huge, the microorganisms gathered in the sediments are mobilized to exert the impact resistance ability. During the production interval, in the sediments, the molecule with a higher degree of polymerization and the dead microorganisms thallus provide the basis for survival and growth of the microorganisms, while the pool hole contributes to material diffusion and microbial population balance to decompose toxins produced by biological metabolism, remove contaminants from the water, and provide dilution buffer conditions for a new round of wastewater treatment.

The Chinese patent No. CN102977246 B titled "A continuous tubular horizontal plug flow reactor for preparing continuous bulk SAN resin and a preparation method thereof" discloses in detail an example of a horizontal plug flow reactor used in practical chemical production, which particularly relates to a two-stage continuous tubular plug horizontal flow reactor system with multiple parallel connections and a production process of preparing high performance SAN resin.

In summary, the above-mentioned three types of reactors have their own respective advantages. However, up to now, there is no photocatalytic reactor in which the upper-spreading reactor, the internal diffusion reactor and the horizontal plug flow reactor are combined with photocatalysis, no photocatalytic reaction water treatment device in which the upper-spreading reactor, the internal diffusion reactor and the horizontal pushing reactor are combined with a skid mounted device, and also no wastewater treatment device in which the photocatalytic reactor is combined with the skid mounted device applied to sewage treatment (especially the wastewater with chemical oxygen demand (COD) greater than 1000 mgL−1). In particular, the devices used in industry today do not achieve a desired efficiency and effect on wastewater treatment.

SUMMARY

Directed to the shortcomings of the existing technology, the present disclosure fully takes current research and application of photocatalysis in the field of environmental pollution into consideration. In consideration of the current situation where the photocatalytic water treatment equipment has not been widely applied in practical production, in application fields and the inherent advantages of the skid mounted device itself, such as ease of installation and disassembly, flexibility to install on large transportation vehicles and full utilization of the floor space, etc., the photocatalytic water treatment equipment and the skid mounted device are combined to give full scope to their respective advantages. The disclosure is intended to provide a skid mounted device for upper-spreading internal diffusion vertical plug flow photocatalytic wastewater treatment, which is used for efficiently treating various industrial wastewater and solves the problem that the water treatment equipment is large in size, large in area, complicated in operation, insecure, and cannot stably meet the requirements of the national discharge water quality index.

The technical solution of the present disclosure is implemented as follows:

A skid mounted device for upper-spreading internal diffusion vertical plug flow photocatalytic wastewater treatment includes the internal diffusion vertical plug flow photocatalytic reaction tank groups (2) and a skid base (7). The internal diffusion vertical plug flow photocatalytic reaction tank groups (2) are arranged on the skid base (7). The internal diffusion vertical plug flow photocatalytic reaction tank groups (2) are connected to each other in series, in parallel, or in series-parallel. Each internal diffusion vertical plug flow photocatalytic reaction tank group (2) consists of two or more internal diffusion vertical plug flow photocatalytic reaction tanks (21) connected in series, in parallel, or in series-parallel. Wastewater pipes (29) connected to the photocatalytic reaction tanks in the internal diffusion vertical plug flow photocatalytic reaction tank group (2) are mounted above the photocatalytic reaction tanks (21). All components are connected successively through anti-corrosion pipelines.

Further, the internal diffusion vertical plug flow photocatalytic reaction tank groups (2) are arranged inside the container (8), and the container (8) is arranged on the skid base (7).

Further, the flocculation precipitation system (1) is connected before the skid mounted device of upper-spreading internal diffusion horizontal plug flow photocatalytic wastewater treatment. The flocculation precipitation system (1) includes the filtration precipitation tank (12), the flocculation tank (11) and the wastewater tank (5). After the wastewater in the wastewater tank (5) is pumped by the wastewater pump into the filtration precipitation tank (12), the flocculant is added to flocculate and precipitate the suspended solids and some organic substances to prevent the device from blocking.

Further, the waste residue collection system (3) is connected behind the skid mounted device for the upper-spreading internal diffusion vertical plug flow photocatalytic wastewater treatment.

Further, the peristaltic pump (27) is provided inside the container (8). One end of the peristaltic pump (27) is connected to the reagent box (22) and the other end of the peristaltic pump (27) is connected to each photocatalytic reaction tank (21) through a hose.

Further, the light tube (25) lined with a quartz sleeve and the catalyst-carrying carrier (26) are provided inside the photocatalytic reaction tank (21). The size of the photocatalytic reaction tank (21) can be adjusted as needed by the catalyst. The lower water inlet (23a) is connected to the lower portion of the photocatalytic reaction tank (21). The side water inlet (23b) is also provided at the lower side part. The water outlet (24) is provided at the side 8-10 cm from the top. The series connection, the parallel connection and the series-parallel connection of the photocatalytic reactors can be controlled by opening and closing the valves (23c). The connection groove (28) is arranged between two adjacent photocatalytic reaction tanks (21).

Further, the number of the internal diffusion vertical plug flow photocatalytic reaction tank groups (2) is greater than two and can be arbitrarily assembled according to the characteristics of the wastewater to be treated. The assembly method can be the series connection, the parallel connection and the series-parallel connection by providing valves (23c) between the water inlets (23a) in the lower part of internal diffusion vertical plug flow photocatalytic reaction tank.

Further, the photocatalyst-carrying carrier (26) has a circular structure and is enclosed by a stainless steel filter mesh (61). The carriers are connected by the brackets (62) and are longitudinally arranged in the photocatalytic reaction tank. The shape of the photocatalytic reaction tank (21) may be a cylinder or a cuboid or a cube. The cavity of the photocatalytic reaction tank (21) and the catalyst-carrying carrier (26) is made of stainless steel.

Further, the shape of the photocatalytic reaction tank (21) is a cuboid, which reduces the volume of the device and facilitates space saving.

Further, the top of the photocatalytic reaction tank (21) is provided with the foam catcher (21b) and the vent hole (21a).

The associated circuits and valves can be controlled in the operating cabinet (9) and the operating cabinet (9) is placed in the container (8).

Because the flocculation and precipitation system, the photocatalytic reaction treatment system and the waste residue collection system are independent units, according to the characteristics of the wastewater, they can be separately used, and can also be combined and operated collectively.

Working Principle:

In the device, the series connection, the parallel connection and the series-parallel connection mode between the skid mounted internal diffusion vertical plug flow photocatalytic reaction tank and the photocatalytic reaction tank group are used to improve the speed and the efficiency of wastewater treatment. The internal diffusion vertical plug flow photocatalytic reaction tanks are connected in series-parallel multi-stage reaction mode to each other, so as to enhance the effect of wastewater treatment. In addition, combined with the synergistic effect of the main catalyst and the cocatalyst, the efficiency of the photocatalytic reaction is further improved. Besides, the wastewater enters the internal diffusion vertical plug flow photocatalytic reaction tank of the disclosure from bottom to top, so the organic matter in the wastewater can fully react with the catalyst in the photocatalytic reaction tank under the action of internal diffusion by controlling the flow rate of wastewater entering the reaction tank, effectively enhancing the effect of the photocatalytic reaction. The photocatalytic reaction tank is a horizontal plug flow reactor, without back mixing at all in the flow direction under the ideal condition and achieves the maximum mixing in the plane perpendicular to the flow direction to further improve the efficiency of the photocatalytic reaction.

The internal diffusion is a form of molecular diffusion, mostly referring to the two processes including the process in which the reactant diffuses from the outer surface into the interior of the catalyst pores and the process in which the product diffuses from the inner surface to the outer surface. Thus, in the two internal diffusion processes including the process in which the reactant diffuses from the outer surface into the interior of the catalyst pores and the process in which the product diffuses from the inner surface to the outer surface, external water pressure (if the pressure exists, the opposite effect generates to hinder the diffusion process of the reactant in the catalyst pore, thereby reducing the actual reaction efficiency) is not needed. The horizontal plug flow has no back mixing at all in the flow direction under the ideal condition and achieves the maximum mixing in the plane perpendicular to the flow direction. In the horizontal plug flow reactor, the fluid flows in a horizontal plug flow manner, which is a continuous flow reactor. In a stable state, the state of the fluid in the horizontal plug flow reactor merely changes with the axial position and does not change over time. The horizontal plug flow reactor is also known as the ideal displacement reactor or the piston flow reactor. The physical parameters in the radial section of the material in the plug flow reactor are identical and the concentration and temperature are associated with the axial distance.

In the present disclosure, the "internal diffusion" and the "horizontal plug flow" are combined to mutually cooperate, so as to meet the requirement of molecular diffusion in the internal diffusion process. The contact reaction process between wastewater and catalyst is not disturbed or interrupted and each reaction is entirely complete, thereby maximally economizing time and achieving the industrial level production efficiency. The internal diffusion vertical plug flow photocatalytic reaction tank group (2) is the horizontal plug flow reactor of the present disclosure.

Wastewater series connection flowing mode: the water outlet is provided on the upper portion of each photocatalytic reaction tank (21), the water inlet is provided on the lower portion of each photocatalytic reaction tank (21), the light tube (25) with a quartz sleeve and the catalyst-carrying carrier (26) are provided on the middle portion of each photocatalytic reaction tank (21), and the connection groove (28) is arranged between two adjacent photocatalytic reaction tanks (21). In this way, in the non-pressure state, the wastewater flows from the lower inlet (23b) of one of the two adjacent photocatalytic reaction tanks (21), and then flows from bottom to top. After reaching the upper portion, the wastewater flows into the connection groove (28) through the water outlet. In the connection groove, the wastewater flows to the bottom of the connection groove from top to bottom, and then flows into the other photocatalytic reaction tank (21) through the lower water inlet (23b) provided in the other photocatalytic reaction tank (21). In the other photocatalytic reaction tank (21), the wastewater flows from bottom to top and reaches the other connection groove. This process is repeated continuously. The wastewater to be treated continuously flows in the horizontal plug flow reactors, and finally flows out of the water outlet (24) of the internal diffusion vertical plug flow photocatalytic reaction tank group (2).

During working, the wastewater to be treated is injected into the photocatalytic reaction tanks of the plurality of photocatalytic reaction tank groups through the wastewater tank at the top of the container; the ultraviolet light in the photocatalytic reaction tank is turned on; the wastewater enters the photocatalytic reaction tank of the photocatalytic reaction tank group for continuous reaction; the wastewater flows into the photocatalytic reaction tank from the bottom thereof and gradually overflows the catalyst in the photocatalytic reaction tank; by controlling the flow rate of the wastewater and the organic matter in the wastewater can fully react with the catalyst under the internal diffusion action of the wastewater. After the reaction is finished, the treated wastewater flows out of the upper side of the photocatalytic reaction tank. The plurality of photocatalytic reaction tank groups simultaneously operate in the parallel connection manner, which solves the problem of small wastewater treatment capacity in industrial application and improves the efficiency of wastewater treatment. The plurality of photocatalytic reaction tanks operate in the series connection manner, which solves the problem that the wastewater fails to meet the discharge standard in industrial application due to poor wastewater treatment effect.

In order to prevent the wastewater from entering the photocatalytic reaction tank from a large amount of suspended solids to block the device, before entering the photocatalytic reaction tank, the wastewater may be introduced into the filtration precipitation tank, and then into the flocculation tank after precipitation. After the wastewater enters the flocculation tank, the flocculant and the coagulant are added. The mechanical agitator is arranged in the middle of the flocculation tank to thoroughly mix the wastewater with the flocculant and the coagulant, thereby removing a part of the suspended solids in the wastewater. The supernatant treated by flocculation and precipitation is pumped by the wastewater treatment pump into the photocatalytic reaction tank in the photocatalytic reaction system for photocatalytic treatment.

Meanwhile, in order to further enhance the effect of the main catalyst, a certain proportion of the cocatalyst is proportionally added to the photocatalytic reaction tank by using the peristaltic pump and reacts with the organic matter in the wastewater under the synergistic effect with the main catalyst. After the catalytic treatment, the photocatalyst in the photocatalytic reaction tank is pumped into the waste residue collection system by the self-priming pump, so the water discharged through the water outlet can obtain/achieve the discharge standard.

The circular structure photocatalyst-carrying carrier is enclosed by a stainless steel filter mesh. The carriers are connected by a bracket and are longitudinally arranged in the photocatalytic reaction tank. When the catalyst needs to be added, the following steps are performed: taking out the bracket, opening the stainless steel filter mesh, placing the catalyst, closing the stainless steel filter mesh, and then putting the bracket into the reaction tank. When the catalyst needs to be removed after deactivation, the following steps are performed: taking out the bracket, opening the stainless steel filter mesh, and taking out the catalyst. The catalyst-carrying carrier can effectively avoid the loss of the photocatalytic material, realize the recycling and reuse of the catalytic material, greatly reduce the deactivation rate of the catalytic material, and ensure the processing capability of the device.

According to the characteristics of the wastewater to be treated, the foam catcher may be provided at the top of the photocatalytic reaction tank.

Since all components are arranged on the skid base to form an integrated structure, the components can be readily installed and disassembled in a free combination manner as needed, and can be carried on large transportation vehicles to ensure its flexibility and make full use of the floor space.

According to the characteristics and needs of the wastewater to be treated, a plurality of skid mounted devices for upper-spreading internal diffusion horizontal plug flow photocatalytic wastewater treatment can be assembled in series, in parallel or in series-parallel to improve the effect and efficiency of wastewater treatment.

Compared with the prior art, the advantages of the present disclosure are as follows:

1. The speed and efficiency of wastewater treatment are improved by utilizing the series-parallel connection between the skid mounted internal diffusion horizontal plug flow photocatalytic reaction tanks. The effect of wastewater treatment is enhanced by the series-parallel multi-stage reaction mode between the internal diffusion vertical plug flow photocatalytic reaction tanks. Concurrently, due to the synergistic effect of the main catalyst and the cocatalyst, the efficiency of the photocatalytic reaction is further improved. The wastewater treatment efficiency of the device can reach 1-5 tons per hour.

2. In the present disclosure, the components are arranged on the skid base to form an integrated structure. Thus, the structure is compact, simple and reasonable, it is convenient to install, disassemble, adjust and clean, the maintenance and operation costs are low in price, the manipulation is simple, the types of decontamination are various, the efficiency is high, the operation is stable, the management is effortless, and the discharged water meets the national discharge standards.

3. In the present disclosure, the loss of the photocatalytic material can be effectively avoided by using the catalyst-carrying carrier, which realizes the recycling and reuse of the catalytic material, greatly reduces the deactivation rate of the catalytic material, and ensures the processing capability of the device.

4. In the present disclosure, the construction investment of the wastewater treatment system can be reduced by half, and the occupied volume of the device is one third of that of the fixed treatment system, which effectively solves the problem of constructing the wastewater treatment device in small enterprises and in remote areas.

5. The high-efficiency photocatalytic wastewater treatment reaction tank is used to make the treated water obtain/reach the discharge index and realize the recycling of water resources.

6. The device can be quickly transported to the assigned location, and then is ready to install and use immediately. Furthermore, the device can start to operate in a very short time, and possess the ability to efficiently treat the high chromaticity industrial wastewater, which can be used as a special device for wastewater treatment in an ordinary factory and can also function in emergencies.

Figure 1:
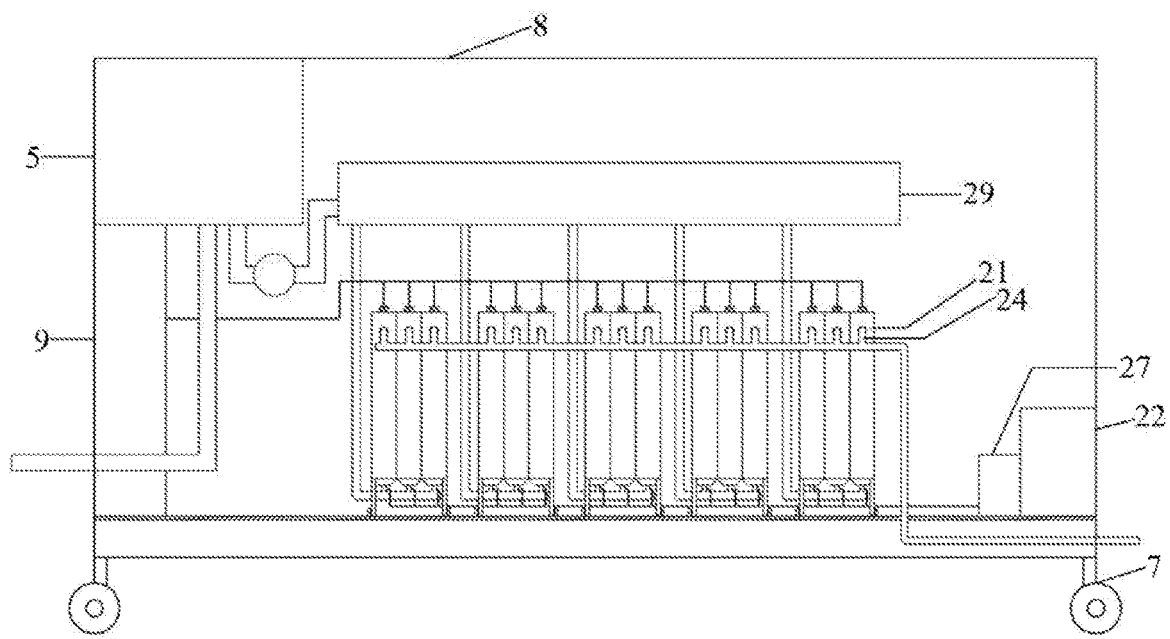
FIG. 1 is a structural schematic view of a skid mounted device for upper-spreading internal diffusion vertical plug flow photocatalytic wastewater treatment.
Figure 2:
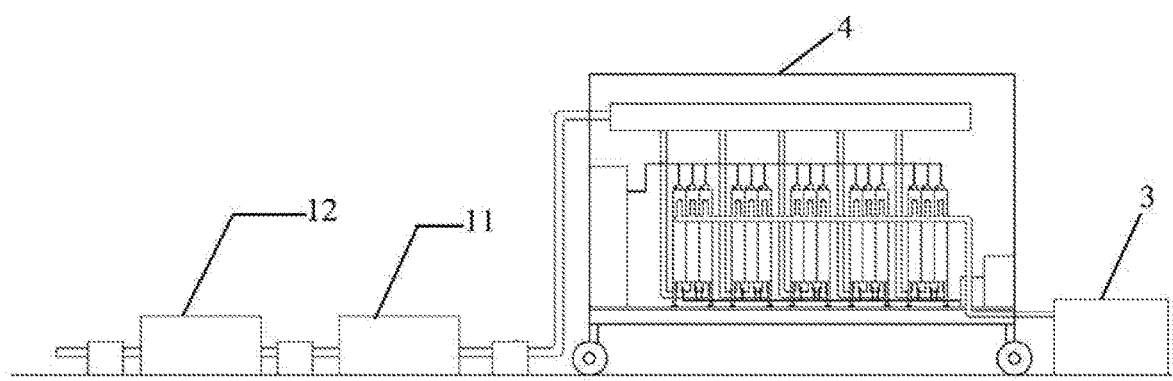
FIG. 2 is a schematic view showing the structure of the skid mounted device for the upper-spreading internal diffusion horizontal plug flow photocatalytic wastewater treatment with a flocculation and precipitation system.
Figure 3:
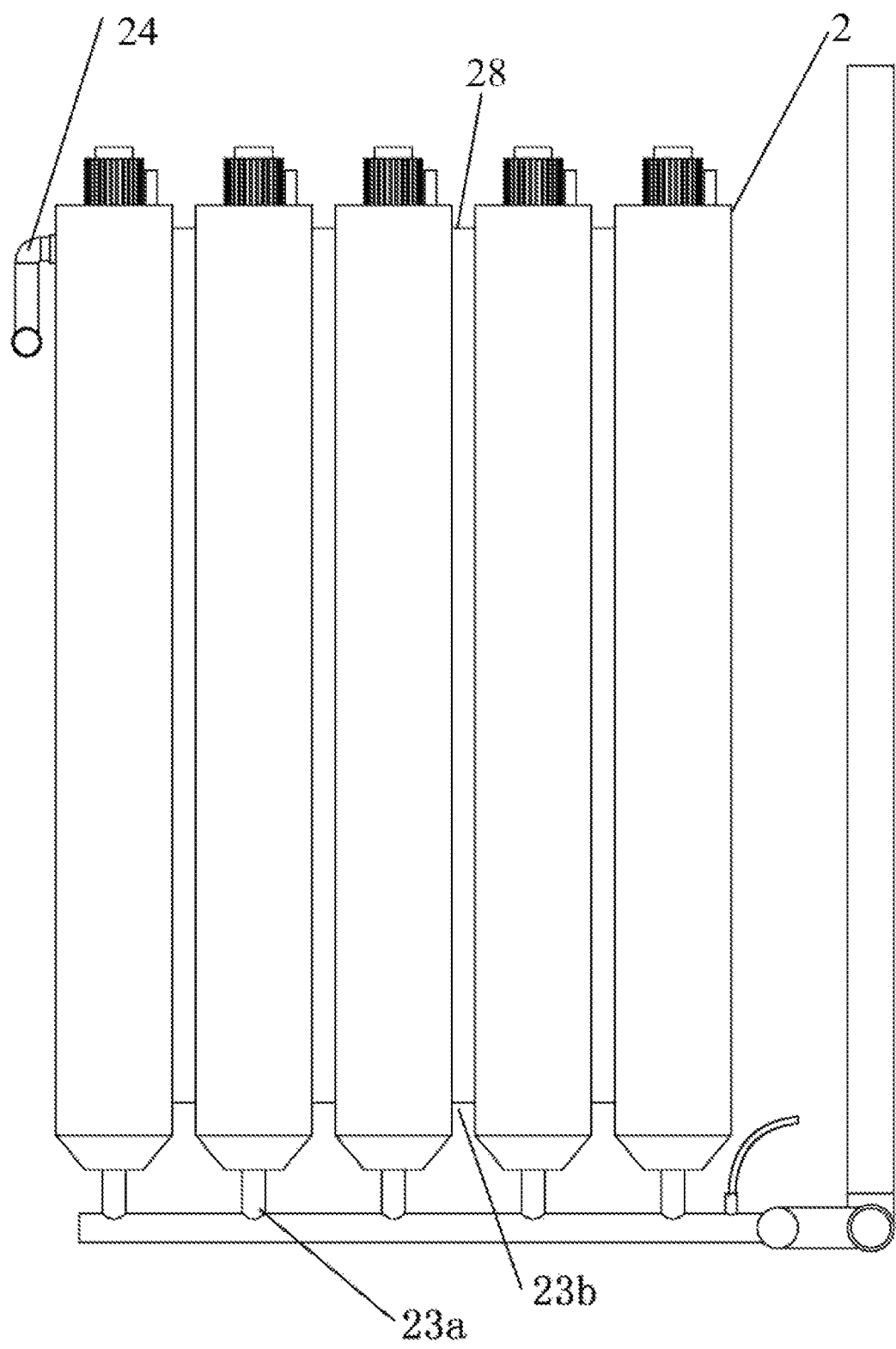
FIG. 3 is a structural schematic view showing a photocatalytic reaction tank group.
Figure 4:
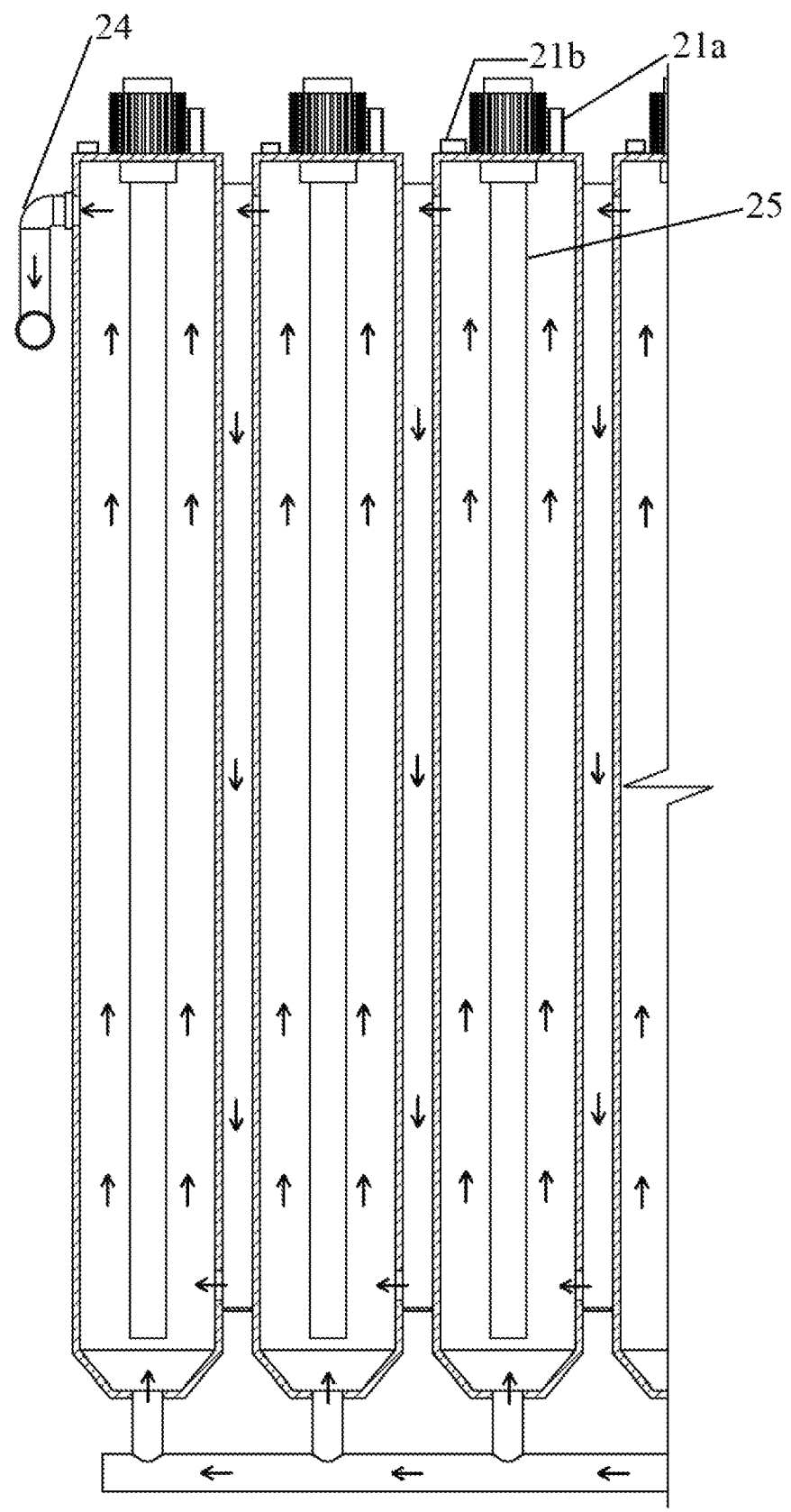
FIG. 4 is a water flow diagram of the photocatalytic reaction tank group.
Figure 5:
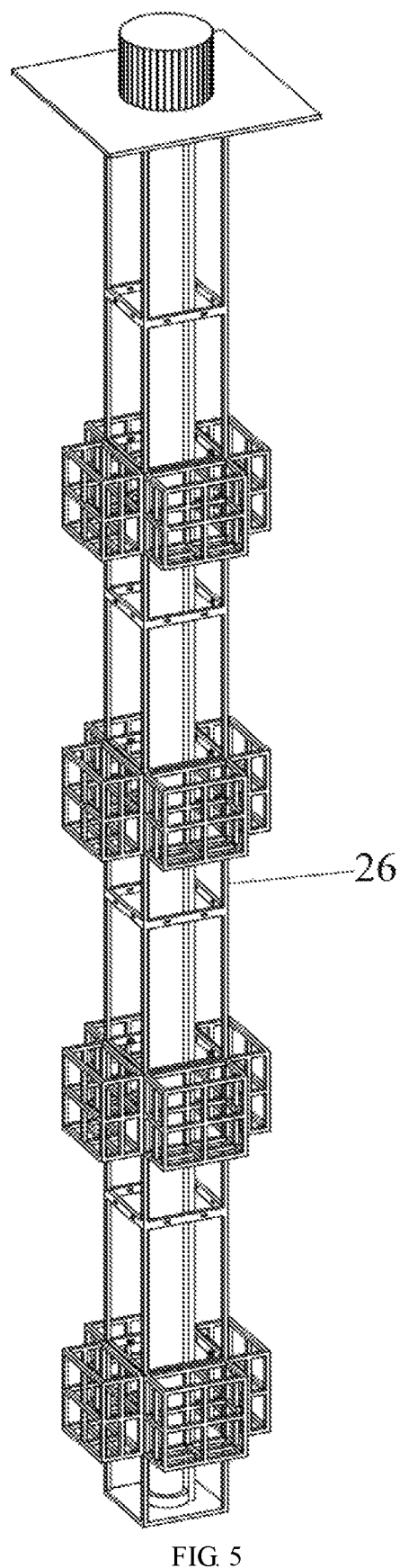
FIG. 5 is a structural schematic view showing a catalyst-carrying carrier.
Figure 6:
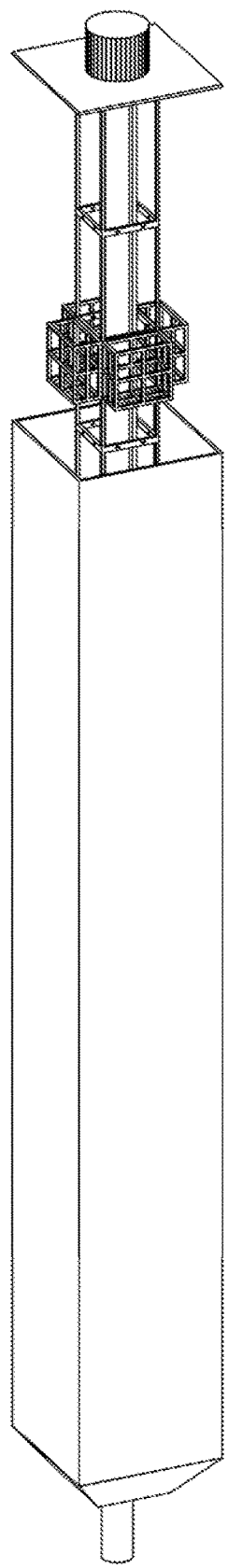
FIG. 6 is a schematic view showing the catalyst-carrying carrier placed in a photocatalytic reaction tank.
Figure 7:
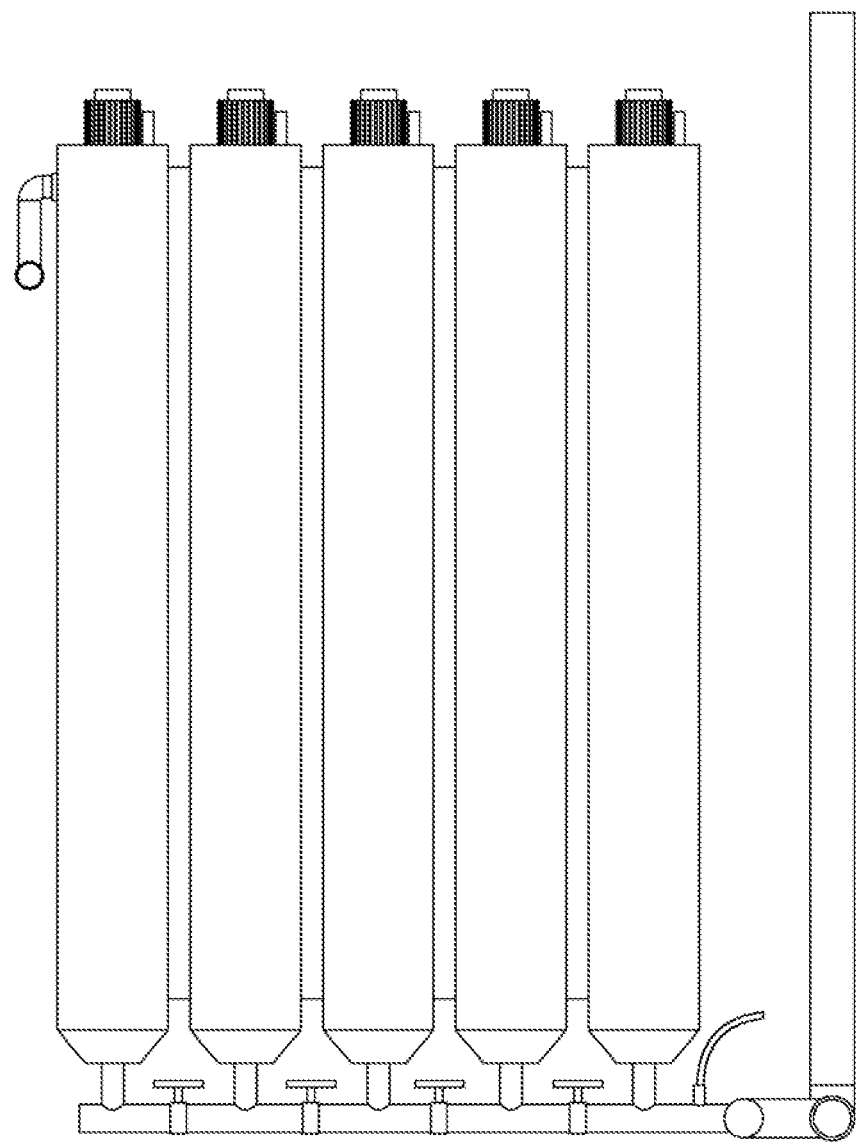
FIG. 7 is a schematic view showing the series-parallel structure of each photocatalytic reaction tank in the device.

In the drawings:
1—Flocculation precipitation system
11—Flocculation tank
12—Filtration precipitation tank
2—Photocatalytic reaction tank group
21—Photocatalytic reaction tank
22—Reagent box
24—Water outlet
25—Light tube
26—Catalyst-carrying carrier
27—Peristaltic pump
28—Connection groove
21a—Vent hole
21b—Foam catcher
23a—Lower water inlet
23b—Side water inlet
23c—Valve
29—Wastewater pipe
3—Waste residue collection system
4—Skid mounted internal diffusion photocatalytic reaction device
5—Wastewater tank
61—Stainless steel filter mesh
62—Bracket
7—Skid base
8—Container
9—Operating cabinet

DETAILED DESCRIPTION OF THE EMBODIMENTS

The present disclosure is further described hereinafter with reference to the drawings. The specific embodiment is merely intended to illustrate the present disclosure and forms no limit to the scope of the present disclosure.

As shown in FIGS. 1-8, the disclosure relates to the skid mounted device 4 for upper-spreading internal diffusion horizontal plug flow photocatalytic wastewater treatment where the skid mounted device 4 includes the internal diffusion horizontal plug flow photocatalytic reaction tank groups 2, the container 8 and the skid base 7. The internal diffusion horizontal plug flow photocatalytic reaction tank groups 2 are arranged on the skid base 7. The internal diffusion horizontal plug flow photocatalytic reaction tank groups 2 are connected to each other in series, in parallel, or in series-parallel. Each internal diffusion horizontal plug flow photocatalytic reaction tank group 2 consists of two or more internal diffusion horizontal plug flow photocatalytic reaction tanks 21 connected in series, in parallel, or in series-parallel. The wastewater pipes 29 are connected to each internal diffusion horizontal plug flow photocatalytic reaction tank group and are mounted above the internal diffusion horizontal plug flow photocatalytic reaction tanks 21. All components are connected successively through anti-corrosion pipelines.

According to the characteristics of the wastewater to be treated, the flocculation precipitation system 1 is connected before the photocatalytic reaction system 2. The flocculation precipitation system 1 includes the filtration precipitation tank 12, the flocculation tank 11 and the wastewater tank 5. After the wastewater in the wastewater tank 5 is pumped by the wastewater pump into the filtration precipitation tank 12, the flocculant is added to flocculate and precipitate the suspended solids and some organic substances. The light tube 25 lined with a quartz sleeve and the catalyst-carrying carrier 26 are provided inside the photocatalytic reaction tank 21. The size of the photocatalytic reaction tank 21 can be adjusted as need by the catalyst. The lower water inlet 23a is provided at the lower portion of the photocatalytic reaction tank 21. The side water inlet 23b is provided at the lower side. The water outlet 24 is provided at the side 10 cm from the top. The photocatalyst-carrying carrier 26 has a circular structure, is enclosed by a stainless steel filter mesh 61. The carriers are connected by the brackets 62 and are longitudinally arranged in the photocatalytic reaction tank. The shape of the photocatalytic reaction tank 21 may be a cylinder, a cuboid or a cube, and the material of both the photocatalytic reaction tank 21 cavity and the catalyst-carrying carrier 26 is stainless steel. The top of the photocatalytic reaction tank 21 is provided with the foam catcher 21b and the vent hole 21a. Each photocatalytic reaction tank group consists of two or more photocatalytic reaction tanks. Each skid mounted device is provided with two or more photocatalytic reaction tank groups. The assembly method includes the series connection, the parallel connection or the series-parallel connection by providing the valves (23c) between the water inlets 23a in the lower portion of the internal diffusion vertical plug flow photocatalytic reaction tank. The connection groove 28 is arranged between two adjacent photocatalytic reaction tanks 21.

Preferably, the shape of the photocatalytic reaction tank 21 is a cuboid, which effectively reduces the volume of the equipment and facilitates space saving.

The middle portion of the flocculation tank 11 is provided with the mechanical agitator 13. The photocatalytic reaction tank group is provided with the peristaltic pump 27. One end of the peristaltic pump 27 is connected to the reagent box 22, and the other end of the peristaltic pump 27 is connected to each photocatalytic reaction tank 21 through the hose.

The skid mounted photocatalytic wastewater treatment system can operate continuously or intermittently, and the method of adding flocculant is a dry input method.

During working, the wastewater in the wastewater tank is pumped by the wastewater pump into the flocculation tank 11 through the simple filtration precipitation tank 12. The appropriate flocculant is added into the flocculation tank 11, and alternatively, the pH adjusting agent or the antifoaming agent may be added as needed. The mechanical agitator is arranged in the middle of the flocculation tank to thoroughly mix the wastewater with the added reagent during the flocculation stage. Then, the supernatant in the flocculation tank 11 is injected into the wastewater tank by the self-priming pump 6, and is pumped into the wastewater pipe 29 on the top of the skid mounted photocatalytic reaction device by the water pump. At the same time, the wastewater to be treated is injected into the photocatalytic reaction tanks of the plurality of photocatalytic reaction tank groups 2. The ultraviolet light in the photocatalytic reaction tank 21 is turned on. The wastewater flows from the bottom of the photocatalytic reaction tank 21 and gradually overflows the catalyst-carrying carrier and the catalyst in the photocatalytic reaction tank. By using a solenoid valve to control the flow rate of the wastewater, the organic matter in the wastewater can fully react with the catalyst under the internal diffusion action of the wastewater. During the reaction, the wastewater enters the lower side of the photocatalytic reaction tank from the wastewater tank through the pipeline, and then enters the photocatalytic reaction tank for a reaction. After the reaction, the treated wastewater flows out of the upper side of the photocatalytic reaction tank for continuous reaction. The plurality of photocatalytic reaction tank groups operate simultaneously, which solves the problem of small wastewater treatment capacity in an industrial application and improves the efficiency of wastewater treatment. The plurality of photocatalytic reaction tanks are connected in series, which solves the problem that the discharged wastewater fails to meet the discharge standard in an industrial application due to the poor wastewater treatment effect. In each photocatalytic reaction tank 21, the wastewater flows from bottom to top. With the rise of the water level, the liquid surface gradually overflows the photocatalyst-carrying carrier 26 and the catalyst therein on each layer. The power source is turned on, and the ultraviolet light tube 25 starts to work. The organic matter in the wastewater reacts adequately. Meanwhile, a certain proportion of the reagent is proportionally added to the reagent box 22 by the peristaltic pump 27, and then enters the photocatalytic reaction tank 21 for a reaction. After the reaction is completed, the treated wastewater flows out through the water outlet 24 on the upper side of the photocatalytic reaction tank. The treated wastewater is introduced into the waste residue collection system 3. Further treatment can be performed in the reaction tank as needed, and finally the wastewater is discharged to finish the reaction. The related circuits and valves are controlled in the operation cabinet 9.

The specific number of the photocatalytic reaction tanks 21 to complete the reaction can be adjusted according to the specific parameters of the water sample.

In the present disclosure, the "internal diffusion" and the "horizontal plug flow" are combined to cooperate with each other, so as to meet the requirement of molecular diffusion in the internal diffusion process. The contact reaction process between the wastewater and the catalyst is not disturbed or interrupted and each reaction is entirely complete, maximally economizing time and achieving the industrial level production efficiency. The internal diffusion vertical plug flow photocatalytic reaction tank group 2 is the horizontal plug flow reactor of the present disclosure.

Figure 8:
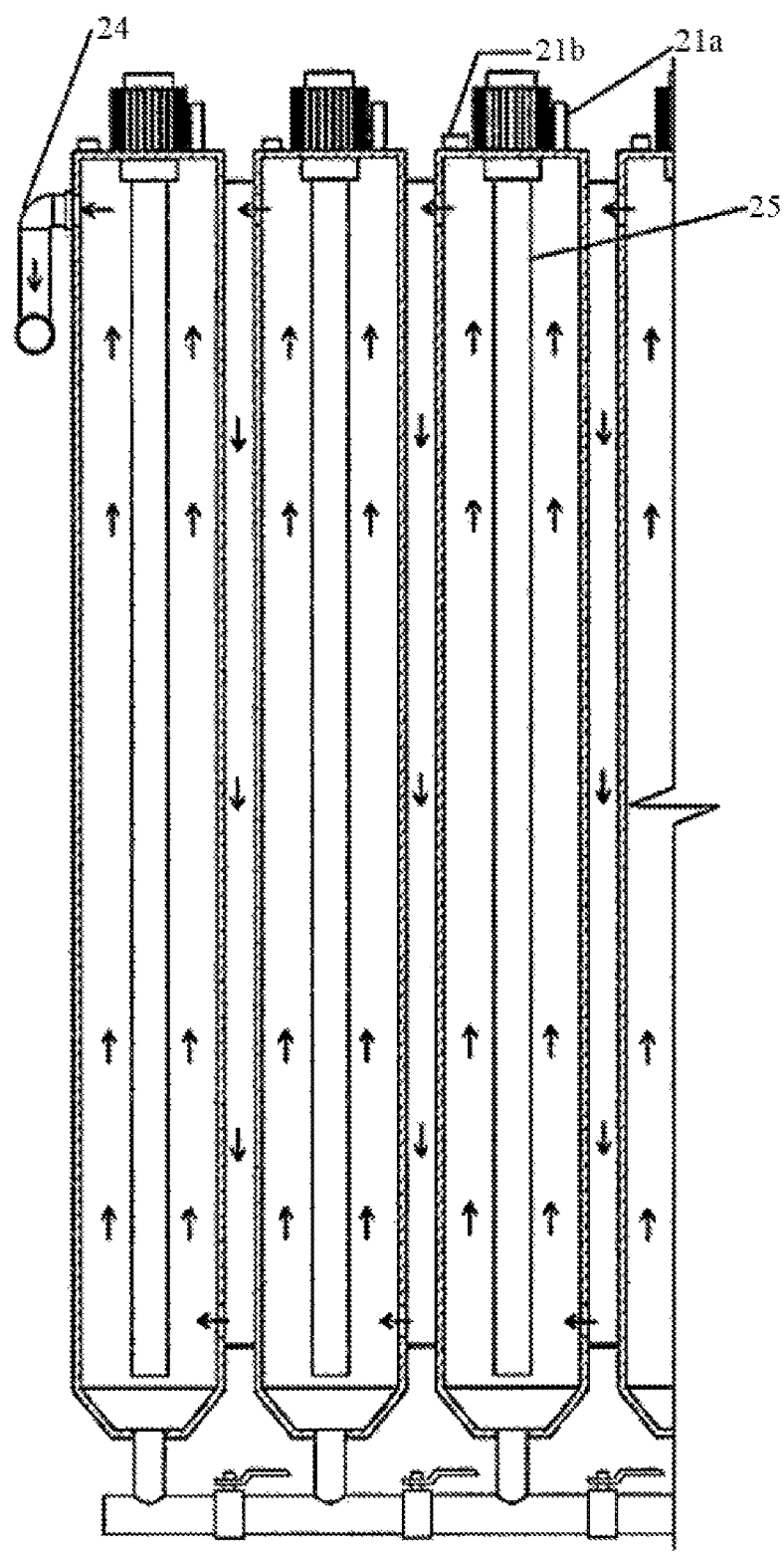
FIG. 8 is a schematic view showing the series connection structure of photocatalytic reaction tank.

As shown in FIG. 8, the wastewater series connection flowing mode: the valve at the lower portion of the photocatalytic reaction tank 21 is closed. Each photocatalytic reaction tank 21 is provided with the water outlet on the upper portion, with the water inlet 23b on the lower portion, with the light tube 25 with the quartz sleeve and the catalyst-carrying carrier 26 on the middle portion. The connection groove 28 is arranged between two adjacent photocatalytic reaction tanks 21. Consequently, in the non-pressure state, the wastewater flows from the lower inlet 23b of one of the two photocatalytic reaction tanks 21, and then flows from bottom to top. After reaching the upper portion, the wastewater flows into the connection groove 28 through the water outlet. In the connection groove, the wastewater flows to the bottom of the connection groove from top to bottom, and then flows into the other photocatalytic reaction tank 21 through the lower water inlet 23b. In the other photocatalytic reaction tank 21, the wastewater flows from bottom to top and into the other connection groove. This process is repeated continuously. The wastewater to be treated continuously flows in the horizontal plug flow reactors, and finally flows out of the water outlet 24 of the internal diffusion vertical plug flow photocatalytic reaction tank group 2.

The photocatalytic reaction tank group 2 composed of the photocatalytic reaction tank 21 and the photocatalytic reaction tank 21 are connected in series to completely treat the organic matter in the wastewater by continuous reactions, which has a good treatment effect. The photocatalytic reaction tank group 2 and the photocatalytic reaction tank 21 are connected in parallel to simultaneously treat and discharge the wastewater, which improves the efficiency of wastewater treatment and economizes energy consumption. The device can treat wastewater up to 1-5 tons per hour, and flexibly adjust the flow rate to control the final treatment amount according to the actual water quality.

According to the characteristics of the wastewater to be treated and the requirements, a plurality of skid mounted devices for the upper-spreading internal diffusion horizontal plug flow photocatalytic wastewater treatment can be assembled through a control valve(s) in series, in parallel or in series-parallel to improve the effect and efficiency of wastewater treatment.

In the present disclosure, the skid mounted device for wastewater treatment is composed of the photocatalytic reactors in which the upper-spreading reactor, the internal diffusion reactor and the horizontal plug flow reactor are combined with photocatalysis technology and the photocatalytic reactors are combined with the skid mounted device. The wastewater treatment device is applicable to treat wastewater, especially wastewater with chemical oxygen demand (COD) greater than 1000 mgL−1, so that the efficiency, the daily treatment capacity and technical effects of the photocatalytic reactor wastewater treatment can meet industrial level production requirements.

What is claimed is:

1. A wastewater treatment system, comprising:
    at least one photocatalytic reaction tank having at least one inlet and an outlet;
    a wastewater tank fluidly connected upstream of the at least one photocatalytic reaction tank;
    wastewater pipes supported above the at least one photocatalytic reaction tank fluidly connected between the wastewater tank and the at least one photocatalytic reaction tank;
    a pump fluidly connected downstream of the at least one photocatalytic reaction tank;
    an operating cabinet supported by a skid carried on wheels, the operating cabinet contains the at least one photocatalytic reaction tank, the wastewater tank, the wastewater pipes and the pump, and circuits and valves that are operably connected to the pump, the wastewater pipes, the wastewater tank and the at least one photocatalytic reaction tank to operate the wastewater treatment system;
    a flocculation precipitation system fluidly connected to the wastewater pipes upstream of the operating cabinet; and
    a waste residue collection system fluidly connected to the at least one photocatalytic reaction tank downstream of the operating cabinet.

2. The wastewater treatment system according to claim 1, wherein the at least one photocatalytic reaction tank is a plurality of photocatalytic reaction tanks in fluid communication with one another.

3. The wastewater treatment system according to claim 1, wherein the flocculation precipitation system comprises a filtration precipitation tank, a flocculation tank and a wastewater tank.

4. The wastewater treatment system according to claim 1, wherein the pump is a peristaltic pump; one end of the peristaltic pump is fluidly connected to a reagent box downstream of the peristaltic pump, and an other end of the peristaltic pump is fluidly connected to the at least one photocatalytic reaction tank.

5. The wastewater treatment system according to claim 1, wherein a light tube with a quartz sleeve and a catalyst-carrying carrier is provided inside the at least one photocatalytic reaction tank; a lower water inlet is connected to a lower portion of the at least one photocatalytic reaction tank; a side water inlet is provided on a lower side of the at least one photocatalytic reaction tank, and the water outlet is provided at a top side of the at least one photocatalytic reaction tank.

6. The wastewater treatment system according to claim 1, wherein the at least one photocatalytic reaction tank is a plurality of photocatalytic reaction tanks assembled according to characteristics of the wastewater to be treated and the plurality of photocatalytic reaction tanks are fluidly connected to each other by providing valves between a water inlet in a lower portion of each of the plurality of photocatalytic reaction tanks; and a connection groove is arranged between two adjacent photocatalytic reaction tanks.

7. The wastewater treatment system according to claim 5, wherein the catalyst-carrying carrier is a circular or polygonal structure, and is enclosed by a stainless steel filter mesh; the catalyst-carrying carrier is connected by brackets, and is longitudinally arranged in the at least one photocatalytic reaction tank; a shape of the at least one photocatalytic reaction tank is a cylinder or a cuboid or a cube; and a material of both the at least one photocatalytic reaction tank and the catalyst-carrying carrier is stainless steel.

8. The wastewater treatment system according to claim 7, wherein the shape of the at least one photocatalytic reaction tank is cuboid.

9. The wastewater treatment system according to claim 1, wherein a top of the at least one photocatalytic reaction tank is provided with a foam catcher and a vent hole.

* * * * *